US011484003B2

(12) United States Patent
Mostert et al.

(10) Patent No.: US 11,484,003 B2
(45) Date of Patent: Nov. 1, 2022

(54) MILKING SYSTEM

(71) Applicant: Lely Patent N.V., Maassluis (NL)

(72) Inventors: Gerard Mostert, Maassluis (NL); Rik Steenbergen, Maassluis (NL); Frans Emo Diderik Van Halsema, Maassluis (NL)

(73) Assignee: Lely Patent N.V., Maassluis (NL)

(*) Notice: Subject to any disclaimer, the term of this patent is extended or adjusted under 35 U.S.C. 154(b) by 98 days.

(21) Appl. No.: 16/467,310

(22) PCT Filed: Nov. 27, 2017

(86) PCT No.: PCT/NL2017/050778
§ 371 (c)(1),
(2) Date: Jun. 6, 2019

(87) PCT Pub. No.: WO2018/111092
PCT Pub. Date: Jun. 21, 2018

(65) Prior Publication Data
US 2019/0307099 A1 Oct. 10, 2019

(30) Foreign Application Priority Data
Dec. 14, 2016 (NL) .................................... 2017993

(51) Int. Cl.
*A01J 5/01* (2006.01)
*A01J 5/08* (2006.01)
*A01J 5/013* (2006.01)

(52) U.S. Cl.
CPC .......... *A01J 5/0133* (2013.01); *A01J 5/0135* (2013.01); *A01J 5/0138* (2013.01); *A01J 5/08* (2013.01); *A01J 5/01* (2013.01)

(58) Field of Classification Search
CPC .... A01J 5/0133; A01J 5/01; A01J 5/08; A01J 5/0135; A01J 5/0138
See application file for complete search history.

(56) References Cited

U.S. PATENT DOCUMENTS

| 3,968,774 A * | 7/1976 | Massie | A01J 5/0133 |
| | | | 119/14.14 |
| 4,433,577 A * | 2/1984 | Khurgin | A01J 5/01 |
| | | | 119/14.17 |

(Continued)

FOREIGN PATENT DOCUMENTS

| DE | 3609275 A1 * | 9/1987 | ............. A01J 5/007 |
| EP | 0 904 688 A1 | 3/1999 | |

(Continued)

OTHER PUBLICATIONS

International Search Report dated Feb. 21, 2018 in PCT/NL2017/050778 filed Nov. 27, 2017.

*Primary Examiner* — Joshua D Huson
*Assistant Examiner* — Megan J Moroney
(74) *Attorney, Agent, or Firm* — Oblon, McClelland, Maier & Neustadt, L.L.P.

(57) ABSTRACT

A milking system for milking a dairy animal includes a milking cup for obtaining milk, a measuring chamber which is in flow communication with the milking cup for at least temporarily containing the obtained milk, and having a sensor device for measuring at least one property of the milk. The sensor device comprises at least three mutually separate electrodes for measuring values of a first milk property using an electrical and/or electromagnetic variable, and a sensor control unit for actuating the sensor device and for processing the measured values. The sensor control unit is configured to repeatedly select a pair of the electrodes in a targeted manner, the pair comprising a first electrode and a second electrode which differs from the first electrode. The sensor device is configured to measure the value of the variable between the electrodes, and to determine the value of the at least one milk property.

20 Claims, 2 Drawing Sheets

(56) References Cited

U.S. PATENT DOCUMENTS

| | | | |
|---|---|---|---|
| 4,452,176 A * | 6/1984 | Hoefelmayr | G01F 1/52 |
| | | | 119/14.17 |
| 5,035,139 A | 7/1991 | Hoefelmayr et al. | |
| 5,094,112 A | 3/1992 | Hoefelmayr et al. | |
| 5,568,788 A * | 10/1996 | van den Berg | A01J 5/0133 |
| | | | 119/14.02 |
| 5,715,856 A * | 2/1998 | Martin | A01J 5/01 |
| | | | 137/430 |
| 6,073,580 A * | 6/2000 | Graupner | A01J 5/00 |
| | | | 119/14.08 |
| 6,197,538 B1 | 3/2001 | van den Berg et al. | |
| 6,796,271 B2 * | 9/2004 | van den Berg | A01J 5/047 |
| | | | 119/14.01 |
| 8,297,131 B2 * | 10/2012 | Hughes | G01F 11/284 |
| | | | 73/861.08 |
| 2002/0054831 A1 * | 5/2002 | Berg | A01J 5/013 |
| | | | 422/82.05 |
| 2003/0230808 A1 * | 12/2003 | Sinha | H01L 21/76889 |
| | | | 257/754 |
| 2011/0083494 A1 * | 4/2011 | Van Halsema | A01J 5/0137 |
| | | | 73/64.53 |
| 2011/0239945 A1 * | 10/2011 | Van Den Berg | A01J 5/08 |
| | | | 119/14.02 |
| 2012/0245873 A1 * | 9/2012 | Donnangelo | G01N 27/02 |
| | | | 702/65 |
| 2017/0295743 A1 * | 10/2017 | Brown | A01J 5/01 |

FOREIGN PATENT DOCUMENTS

| | | | | |
|---|---|---|---|---|
| EP | 1 000 535 A1 | 5/2000 | | |
| NL | 9400997 | 2/1996 | | |
| WO | WO-9522888 A1 * | 8/1995 | | A01J 5/0138 |
| WO | WO 03/058174 A2 | 7/2003 | | |
| WO | WO-2010071407 A1 * | 6/2010 | | A01J 5/0175 |
| WO | WO 2011/064770 A2 | 6/2011 | | |
| WO | WO-2013135903 A1 * | 9/2013 | | A01J 5/01 |

* cited by examiner

MILKING SYSTEM

FIELD

The present invention relates to a milking system for milking a dairy animal, comprising a milking cup for obtaining the milk, a measuring chamber which is in flow communication with the milking cup for at least temporarily containing the obtained milk, and having a sensor device arranged therein or thereon for measuring at least one property of the milk.

BACKGROUND

Such a milking system is known per se from WO03/058174A2, in particular a measuring system for use in such a milking system. The known system comprises a measuring chamber containing a series of electrodes at different heights. The system is configured to determine a milk level by measuring the conductivity between successively each of the electrodes and a base electrode, evaluating the values and comparing the measured values to a reference conductivity.

This known system has the drawback that it offers little flexibility, and also has limitations in speed and accuracy in terms of the measurements to be carried out.

BRIEF SUMMARY

It is an object of the present invention to provide a measuring system of the type indicated which is faster and/or more flexible in carrying out measurements on milk in the measuring chamber.

The invention achieves this object by means of a milking device as claimed in claim 1, in particular a milking system for milking a dairy animal, comprising a milking cup for obtaining the milk, a measuring chamber which is in flow communication with the milking cup for at least temporarily containing the obtained milk, and having a sensor device arranged therein or thereon for measuring at least one property of the milk, wherein the sensor device comprises a plurality of at least three mutually separate electrodes for measuring values of a first milk property using an electrical and/or electromagnetic variable, and a sensor control unit for actuating the sensor device and for processing the measured values, wherein the sensor control unit is configured to repeatedly select a pair of the electrodes in a targeted manner, the pair comprising a first electrode and a second electrode which differs from the first electrode, and wherein each of the plurality of electrodes is selectable as the first or second electrode, wherein the sensor device is configured to measure the value of the variable between the electrodes of said selected pair, and to determine the value of the at least one milk property on the basis of the value or values of the variable measured using one or more selected electrode pairs.

The invention is based on the possibility of using two arbitrary electrodes for a measurement, in contrast to one fixed base electrode and one arbitrary electrode as in the prior art. The invention uses the insight that the milk level in the measuring chamber will, on the one hand, not always be constant but, on the other hand, will also change only relatively gradually. That means that the group of electrodes to be read out may be limited to those electrodes which adjoin the electrodes at a determined milk level. This makes it quicker to read out and determine, for example, this milk height, as a result of which, for example, a milk flow may be measured more accurately.

In addition, it is possible to measure only a specific or arbitrary part of the milk in the measuring chamber. It is thus possible, for example, to measure a top half, or a part with the foam layer in order to find out more about the properties of the milk foam, without being significantly influenced by the milk layer below it. Alternatively, it is also possible, for example, to measure two or more layers in the milk, and to compare the measured values. It is advantageous in this case if the layers do not overlap, because values from different parts of the milk may then be compared and analyzed. In the known device, all parts of the milk overlap, and the parts/layers are never of the same thickness. In this way, it is also possible to gain a clearer view of the homogeneity of the milk layer. In addition, in many cases it is not at all necessary to make the milk in the measuring chamber more homogeneous, for example by stirring using a stirring device as described in some prior art documents. The effects of a non-homogeneous volume of milk may be counteracted simply as a result of the possibility of taking measurements locally at different heights in the milk (without overlap) and evaluating the local measurements, such as by averaging or determining the spread or the like.

In addition, it is possible to carry out redundant measurements, such as by selecting different pairs of electrodes, which cover different and entirely or partially overlapping layer thicknesses of the milk. As a result, it is possible to correct deviations caused by, for example, soiling of one of the electrodes on the basis of the other measurements. Measurements of the milk in the measuring chamber can thus be made more reliable.

Finally, it is also possible to achieve a higher measurement resolution. After all, it is now readily possible to use a series of electrodes which is vertically more finely dispersed without a measurement taking too much time. A set of a few hundred electrodes could serve as an example. In the above-mentioned prior art, which does mention the possibility of increasing the number of electrodes, a measurement would take proportionately more time, and the system would become slow. In the present system, however, it is possible to limit the number of measurements (in some cases with the exception of a first measurement per milking operation) to a limited number of electrodes around the electrodes which are located directly around, i.e. above and underneath, the boundary layer.

DETAILED DESCRIPTION

Particular embodiments are described in the dependent claims and in the following description.

The electrodes are in particular in a row, and more particularly in a row which extends substantially vertically during milking. In this case, "substantially" means that the angle from the vertical, which could vary during milking, is at most 25°, so that a deviation on the basis of the cosine of the angle is at most 10%. A smaller maximum angle will of course lead to a smaller deviation. Incidentally, it is also possible to arrange one or more electrodes not along such a vertical line, but for example along a horizontal line, along any other line or even any other distribution. After all, the advantage of measuring in other parts of the milk is thus maintained.

In the present application, "in flow communication" is understood to mean that there is a flow path from the milking cup to the measuring chamber, at least temporarily. In this case, it is possible for this communication to be at least temporarily interrupted by, for example, a valve. Furthermore, in most cases the measuring chamber will also comprise a milk discharge, so that milk may also flow out of the measuring chamber again.

In embodiments, the variable comprises a conductance, conductivity or impedance, or amplitude or phase angle thereof. Conductivity is itself an important property of milk. For example, the milk conductivity may be used to obtain a health indication concerning the animal. If, for example, the dairy animal has an udder infection, known as mastitis, in one or more quarters of the udder, the electrical conductivity of the milk from that quarter will be increased. Incidentally, the conductivity may also be used for other purposes, as will be explained in more detail below.

Alternatively or in addition thereto, the impedance of the milk may also be measured, which is in principle a complex variable. In this case, the phase angle and/or the amplitude of the impedance may in particular be measured, allowing, for example, information regarding the composition of the milk to be obtained. Incidentally, all of this will be measured mainly at (higher-frequency) AC voltages between the electrodes.

In embodiments, the first milk property comprises the height of milk in the measuring chamber, wherein the sensor device is configured to measure the variable between a first electrode of the plurality of electrodes, and a second electrode, which is situated higher up during milking, of the plurality of electrodes, and to determine the height depending on the height of the selected pair of electrodes in the measuring chamber and on a comparison of the measured value with the corresponding value as measured by a pair of other electrodes. In particular, the comparison shows that the measured value changes in a predetermined manner with respect to said corresponding value. In this case, use is made, in a manner known per se, of the fact that air which will be present in the measuring chamber above the milk has a much lower conductivity than the milk or the milk foam. Thus, if a measured conductivity value at the location of an electrode is much higher in comparison with a corresponding value measured at the location of the next highest electrode, the boundary surface of the milk, thus the milk level, will be located between these two electrodes. The associated height is then the milk level. In the case that the conductivity value gradually falls at ever higher electrodes, for example owing to a thick foam layer or owing to the large number of electrodes, it will be possible to determine the milk height according to a suitable criterion, which will be discussed in more detail below. In all of this, it is of course necessary to take into account the distance between the electrodes involved in the respective measurements. After all, a greater distance will also represent a lower conductivity. This may be compensated for, for example, by switching to a specific conductivity between the electrodes, such as approximately by dividing the conductance by the distance.

In particular, the predetermined manner comprises that the conductance, conductivity or impedance falls by at least a predetermined percentage, in particular 25%, more particularly 50%, although other percentages are not excluded and may be chosen on the basis of practical measurements. In the case of a clear decrease, it will be possible to reliably conclude that there is a transition between milk and either foam or air. All of this, however, depends to a certain degree on the arrangement of the electrodes and on the method of measurement. For instance, a measurement between on the one hand a bottom electrode and on the other hand an electrode which is in each case higher will sometimes exhibit a smaller decrease than a measurement between adjacent pairs of electrodes which are in each case higher, because the relative contribution of the conductance path through the foam or air layer in the first case is smaller with respect to the milk layer. It should be noted that this effect in the invention may be used by, for example, first measuring in a relatively crude manner and, for example when choosing an electrode situated higher up, skipping over one or more intermediate electrodes, until a clear decrease is measured. Subsequently, it is then possible, in a subsequent step, to measure the skipped-over electrodes, all of this in each case with respect to the lowest, bottom electrode. Alternatively or in addition, it may also be chosen as a subsequent step to take as the new lowest electrode that electrode where the measured conductance had not yet significantly decreased. This electrode is then apparently still located completely in the milk. If new conductance measurements are then taken using this electrode as the bottom electrode with in each case an adjacent higher electrode with respect to the bottom electrode as the top electrode, thus without skipping over an electrode, it is then possible to determine the transition from "milk to foam and/or air" very precisely. This may be even more precise if the control unit is configured to take a further step when detecting the higher electrode at which the conductivity exhibits a significant decrease with respect to the newly chosen bottom electrode, and specifically that of now choosing in each case adjacently higher electrode as the bottom electrode. It will be clear that the freedom to choose electrodes as the bottom and/or top electrode may improve the speed, accuracy and reliability of measurement.

In attractive embodiments, the measuring chamber further comprises a milk discharge opening and a valve device having a controllable passage opening and a valve control unit for controlling the valve device, wherein the valve control unit is operatively connected to the sensor control unit and is configured to control the passage opening on the basis of the measured value of the height. In these embodiments, the height of the milk may be determined quickly, accurately and reliably according to the invention. That provides the possibility of also determining secondary variables such as milk flow quickly, accurately and reliably, on the basis of the measured milk height. After all, it will be possible to simply calculate the flow velocity of the milk given a known height, and known passage opening of the milk discharge opening, so that the flow rate of the milk may be calculated from flow velocity×cross-sectional area of the milk outflow opening.

On the other hand, however, it also quickly, accurately and reliably provides the data on the basis of which the milk level may be kept constant. In particular, the valve control unit is therefore configured in such a way that the height of the milk in the measuring chamber is kept constant as far as possible. As soon as the sensor control unit determines that the milk height has changed, this change may be counteracted in cooperation with the valve control unit. If, for example, the level falls, the valve device may then be closed further, and vice versa. It offers advantages if the milking system has an (approximately) constant milk level, because in that case all sorts of properties of the milk in the measuring chamber will likewise be approximately constant. For example, if the flow properties of the milk in the measuring chamber were to remain the same, hydrostatic effects of the milk column above the part of the milk which is measured would remain the same, etc. It is also important to note that simply the ability to keep the milk level constant may contribute to the speed of measurements in the measuring chamber. After all, if the milk level remains the same, the number of electrodes that need to be measured in order to determine that level is very low. With a low number of electrodes to be measured, the level measurements will be carried out very quickly.

It has also been found in practice that there is less foam and film formation of the milk in the measuring chamber if the milk remains at (approximately) the same level for a time. This makes the measurements even more reliable, "cleaner", so to speak.

In embodiments, the sensor device is also configured to measure a second milk property of the milk in the measuring chamber, not being a milk level, from the measured values. The specific conductivity of the milk may be mentioned here in particular, which, as already described above, provides an indication of whether mastitis is present in the udder. For example, only the (relative) conductance is measured for the purpose of the level of the milk, with changes being sufficiently accurate to determine the level. For the specific conductance value, it is then necessary to accurately include the distance between the relevant electrodes, and if desired to carry out reference measurements. All of this will usually take more time than the relative conductance measurements. It is also possible to measure other milk properties, such as the milk composition already mentioned above, the fat content, etc. It may be the case here that only a subset of the values are used for the first property and another subset of the values are used for the second property.

In embodiments, the sensor device comprises a temperature sensor. This makes it possible to correct the measured values for temperature differences. In general, the milk temperature itself will be relatively constant, but if, for example, the ambient temperature is very low or very high, this may already have an impact on the milk temperature, and thus on the electrical properties which are measured.

The temperature sensor is not subject to any particular limitations, and comprises, for example, a dedicated sensor. However, in embodiments, the electrode of the plurality of electrodes which is at the bottom during milking comprises or is the temperature sensor. In particular, this comprises or is a temperature-dependent resistor. This provides a compact device, with as few components as possible. In this case, the temperature sensor is, for example, attached to the bottom electrode (or to one of the bottom electrodes) under thermally conductive contact. There is thus thermal conduction between the milk, via said electrode(s), to the temperature sensor. For the purpose of readouts, the temperature sensor and the electrode(s) are electrically separated. Other arrangements are also possible.

In embodiments, the sensor control unit comprises a frequency generator and is configured to measure a value of the variable at at least one frequency, and preferably at a series of a plurality of frequencies, wherein the sensor control unit is configured to determine at least one content of a component of the milk on the basis of the measured values. In embodiments, the at least one frequency is between 10 kHz and 10 GHz, in particular greater than 100 kHz, more particularly higher than 1 MHz, and furthermore no more than 6 GHz. The (limits for the) frequencies to be chosen may depend on the object. For example, the frequency range for the content information/composition of milk could be chosen in the range of a few MHz, and the frequency for the conductance measurement could be chosen to be around 10 kHz, in order to prevent electrolysis of milk at the electrodes. In practice, it is simple to determine which frequency/frequencies or frequency range(s) give the best results by means of test measurements. By measuring the electrical properties of milk at different frequencies, it is possible to determine values relating to the milk composition, such as the content of fat, protein and carbohydrates. For details in this regard, reference is made to the prior art, such as NL9400997A. An important observation in this case is that the amount of data provided by this system may be very large, by choosing a multitude of pairs of electrodes and of different frequencies at which measurements are carried out. The conclusions based on the measurements, such as values of milk properties, may thus be determined very accurately and/or reliably and/or locally.

In addition, the sheer amount of data makes it more readily possible to improve the processing of data using machine learning. Therefore, the sensor control unit is in particular configured to use machine learning to process the measured values into at least one value of a milk property, in particular at least one content of a component of the milk. In this case, machine learning involves at least a change in a processing algorithm which processes the measured values into values of a milk property.

In embodiments, the plurality of electrodes is arranged on a printed circuit board. In this case, it is particularly advantageous if the electrodes are connected to the sensor control unit by means of rigid connections of known length, and advantageously the same length. This makes it possible to prevent the occurrence of undesired effects at higher frequencies caused by connections of different lengths, which act, for example, as antennas. On the printed circuit board, or PCB, the connections are fixed tracks, which may simply be made the same length for the different electrodes.

In embodiments, the milking system, in particular the sensor device, further comprises an optical sensor sub-device, in particular having at least one optical sensor such as an RGB chip, and which is configured to measure at least one optical property of the milk or milking operation. With the aid of the optical sensor sub-device, it is possible to gather additional data relating to the milk. For example, a colour of the milk may be determined. It is thus possible to determine whether the milk is coloured red and in that case (probably) contains blood. Such milk is not intended for human consumption, and must be assigned a destination other than the good consumption milk.

In embodiments, the optical sensor sub-device comprises at least one LED, which is configured to emit light detectable by the optical sensor. In this case, the at least one LED and the at least one optical sensor are arranged in such a way that the emitted light is detected by the sensor in at least some situations. It may be the case, for example, that the sensor detects only scattered light, thus, for example, virtually no light if there is little or no scattering, such as in the absence of larger particles in the milk, such as flakes which occur in mastitis. It is also possible that the LED(s) and the optical sensor(s) are arranged specifically opposite one another and are configured for transmission measurements, or also for reflection measurements, or combinations thereof. As a general remark, it should be pointed out here that it may be advantageous to gather such optical measurement values concerning milk, in order to use these and the electrical measurements as the basis for obtaining even more data in order to determine the values of the milk property (or milk properties). Machine learning is also highly suitable in this case.

It is further noted in general here that the milking system comprises a milk destination device which is operatively connected to the sensor device, or at least the control unit thereof, and which is configured, on the basis of the value of the at least one milk property determined by the sensor control unit, to direct the associated obtained milk to one of a plurality of destinations. In such a case, the milk destination system comprises a plurality of discharge lines, at least one of which leads to a consumption milk tank, and at least one of which leads to a sewer or waste milk collection tank.

In embodiments, the measuring chamber is rigidly connected to the milking cup, in particular connected thereto in a unitary manner. In these embodiments, the measuring chamber is located from very close to, to directly at, the outlet from the milking cup. It is thus possible to obtain measured values, and thus values of the milk property or milk properties as quickly as possible, so that action on the basis thereof can also be taken as quickly as possible. In this case, it may, for example, be advantageous if the milking system is configured to carry out a milking-related action on the basis of a certain milk property. The increase in speed may be advantageous, in particular, if a property of foremilk, in other words the first volume of milk, gives reason to carry out such a milking-related action. Nevertheless, it is also possible to take particularly quick action during the further course of a milking intervention if there is reason to do so. For example, if a milking cup is kicked off during a milking operation, the teat could have sustained an injury. After reattachment of the milking cup, there could then be blood in the milk. As this milk is not foremilk, failure to signal blood in good time could lead to undesired contamination of the milk in the consumption milk tank. The milking system according to the invention is able to quickly overcome this situation in an optimum manner.

In embodiments, the measuring chamber is a milk jar. The milking system thus measures one or more properties of the milk in the milk jar. This has the advantage that the sensor device and the like is protected against dairy animal effects such as kicks. Furthermore, these parts do not need to form part of the milking cup, so that the weight thereof may remain lower. In these embodiments, the milking system may be configured, for example, to perform a measurement once, in particular at the end of the milking operation, and then for all of the milk at once. In this case, it is advantageous if the plurality of electrodes and optional other measuring parts extend over the height of the milk jar, so that it is not only possible to determine the volume, but also one or more milk properties locally at different positions. As already described above, this may be used to gain a clear picture of the milk property (or milk properties), even in the case of a non-homogenised volume of milk. A homogeniser, such as an agitator, may thus be omitted. Alternatively, the milking system may be configured to perform a measurement, for example, repeatedly, so that the milk property (or milk properties) may be monitored during the course of the milking operation, and if necessary an associated milking-related action may be performed.

In embodiments, the milking system comprises a milk line which connects the milking cup to a milk tank, wherein the measuring chamber is connected in a closable manner to the milk line by way of a sample line. The measuring chamber thus functions as a sampling chamber, with it being possible to carry out, for example, measurements of longer duration on a milk sample. On the basis of the determined milk property (or milk properties), the milking system may decide to direct the obtained milk to one of a plurality of destinations, as has already been described above. An advantage of this embodiment is that the milking operation itself may proceed unhindered, without the entire milk needing to flow through the measuring chamber.

It should also be noted here that the milking system according to the invention will also comprise parts which are responsible for milk extraction and the like, such as vacuum pumps, pulsators, valves, etc. Since these parts, which are generally known in the prior art and directly available to the person skilled in the art, do not form part of the core of the invention, details regarding these are not included. It is, however, emphasised that the milking system may be both a conventional milking system, with milking cups which are manually attached to the teats by milkers, and a robot milking system, with a teat detection system and a robot arm device for attaching the milking cups to the teats recognised by the teat detection system. These latter parts also do not form part of the core of the invention and are not discussed in further detail here.

BRIEF DESCRIPTION OF THE DRAWINGS

The invention will be explained in more detail below by means of one or more exemplary embodiments and the drawing, in which.

DETAILED DESCRIPTION OF EXEMPLARY EMBODIMENTS

Figure 1:
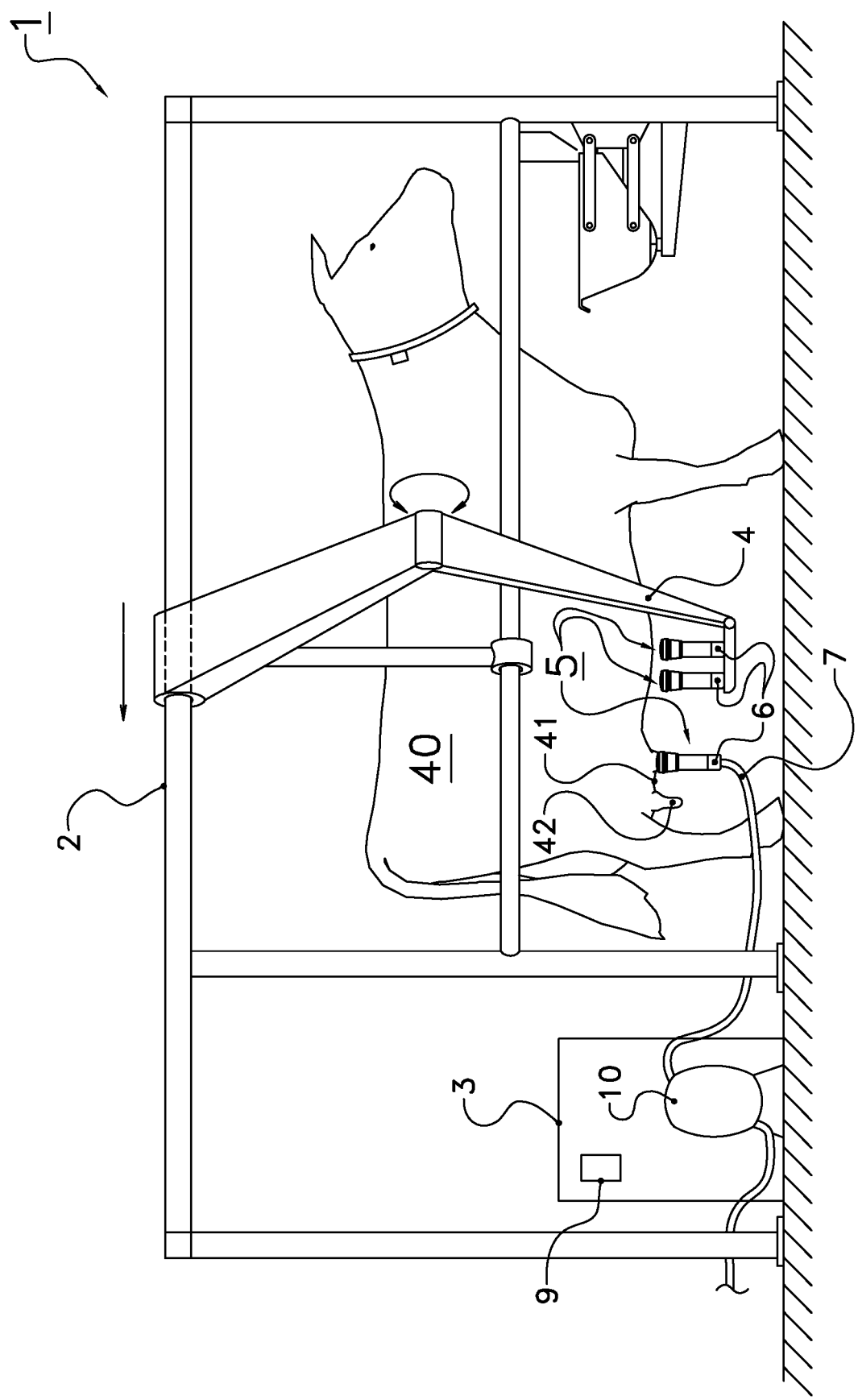
FIG. 1 shows a diagrammatic side view of a milking system according to the invention.

FIG. 1 shows a diagrammatic side view of a milking system 1 according to the invention. The milking system 1 comprises a milking stall 2 with a robot 3 having a robot arm 4, and also a milking cup 5 having a measuring chamber 6 and a milk hose 7 in which there is a valve 8. Reference numeral 9 denotes a control unit and reference numeral 10 denotes a milk jar.

Furthermore, reference numeral 40 denotes a dairy animal with an udder 41 and teats 42.

The illustrated milking system is a milking robot system, which can attach the milking cups 5 fully automatically to the teats 42 of a dairy animal 40, such as a cow. Nevertheless, the invention can likewise be applied to a conventional milking system, where the milking cups are attached to the teats by hand. In the illustrated robot milking system, parts which are not essentially important to the invention, such as a teat detection system and milk pump, are not shown.

The milking cup 5 comprises a measuring chamber 6 which ends in a milk hose 7. The milk hose 7 can be closed using a valve 8 which is under the control of a control unit 9. The milk hose 7 runs from the milking cup/the measuring chamber to the milk jar 10, in which the milk from a milking operation is temporarily stored before it is directed to the milk tank (not illustrated) or another destination.

Figure 2:
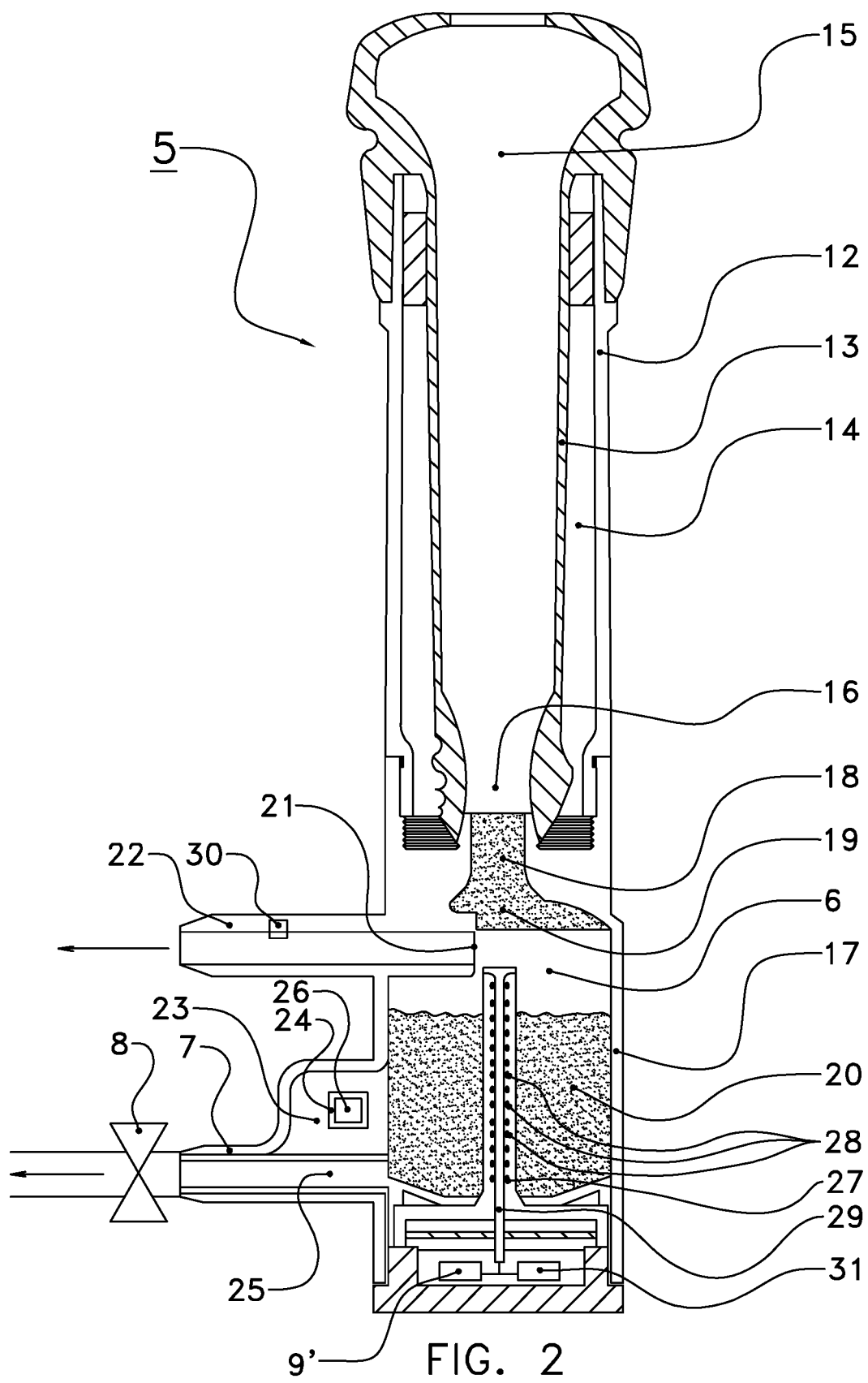
FIG. 2 shows a cross section of part of a milking system according to the invention.

FIG. 2 shows a diagrammatic cross section of part of a milking system according to the present invention. In this figure, similar parts are denoted by the same reference numerals.

The milking cup 5 comprises a cup casing 12 and a liner 13, enclosing a pulsation space 14 between them. In the liner, there is a teat space 15 which ends in a first milk outflow opening 16. A housing 17 for the measuring chamber 6 forms a rigid unit with the milking cup 5. The first milk outflow opening 16 opens (almost) directly into the milk inlet 18 which is connected to the measuring chamber 6 via a convex outflow 19. In this case, there is milk 20 in the measuring chamber 6. Above it, a vacuum line 22 is connected via a vacuum outlet 21. Reference numeral 23 denotes a measurement constriction, on which there is an additional sensor 24 in the form of an RGB chip. The measurement constriction 23 ends in the milk hose 7, via the second milk outflow opening 25.

Reference numeral 26 denotes an LED. Furthermore, a bottom electrode 27 and electrodes 28 are arranged on a printed circuit board 29. Reference numeral 9' denotes a control unit or part of the control unit. Finally, reference numeral 30 denotes a vacuum sensor.

In embodiments, the milking system according to the invention comprises the illustrated rigid combination of a milking cup 5 and a housing 17 with the measuring chamber 6. The milk obtained from the teat in the teat space 15 flows to the measuring chamber 6 via the first milk outflow opening 16 and the milk inlet 18 directly via the outflow 19. The convex form of the outflow 19 and the resulting Coandă effect means that the incoming milk will for the most part "adhere" to the wall of the housing 17, thus resulting in minimal foaming. Partly as a result thereof, a volume of single-phase milk 20 will in principle be formed at the bottom of the measuring chamber 6, with only air being present in the space above. This air, although it is under a lower than atmospheric pressure, can be extracted via the vacuum outlet 21 and the vacuum line 22, which are connected to a vacuum system of the milking system which is not illustrated in detail here. In principle, the pressure will correspond to a normal milk vacuum, such as around 40 kPa.

The housing 17 of the measuring chamber 6 and the cup casing 12 of the milking cup 5 form a rigid unit here. However, it should be noted that this is not necessary for the invention. For example, the milking cup and the housing may be separated by a short section of milk hose, so that, for example, it is more readily possible to ensure that the measuring chamber 6 will always hang substantially vertically during milking. Nevertheless, the direct connection according to FIG. 2 offers the advantage of a more direct measurement of milk from the dairy animal. Alternatively, it is possible to arrange the sensor device with electrodes 27, 28 and/or sensors 24 with the LED 26 in the milk jar, for example on one or more printed circuit boards 29.

The obtained milk is (temporarily) collected in the measuring chamber 6, wherein the milk level will rise at the start of the milking. The level of the milk 20 in the measuring chamber 6 may be measured using the electrodes 27, 28 on the printed circuit board 29. In the illustrated embodiment, this comprises a bottom electrode 27 and a series of electrodes 28 which extend over the height of the measuring chamber 6. In order to quickly and reliably measure and monitor the height of the milk 20, the control unit 9, 9' actuates the electrodes 27, 28 by selecting two electrodes. For example, the conductivity is measured between the bottom electrode 27 and in each case a higher electrode of the electrodes 28 until the conductivity measured between the selected electrode 28 and the bottom electrode 27 falls below a threshold value, or falls by at least a predetermined percentage, such as 50%. However, it is also possible to measure the conductivity between two adjacent, in each case higher electrodes. This has the advantage that although the former method is disrupted in the event of a fault at or on the bottom electrode 27, this has no influence on the latter method. Furthermore, it is thus possible to determine a local conductivity, so that it is easier to reach a conclusion about the local composition (milk, milk foam or air), and possibly even about the homogeneity of the milk or a content of air bubbles.

It should also be noted here that the height of the milk 20 in the measuring chamber 6 has a variable value during milking. The control unit 9, 9' is preferably configured to monitor the milk height by dynamically selecting pairs of electrodes. This is possible, as described above, by in each case starting at the bottom and then scanning upward. It is advantageous, because it is faster, to start a subsequent measurement at the lowest electrode which indicated a conductivity value which satisfied the criterion of "below the threshold value", "at least 50% lower conductivity" or any other predetermined criterion. If, during a new measurement, that electrode 28, or that electrode pair, still satisfies said criterion, the control unit may move on to an electrode situated directly lower, and check how the conductivity value changes at said lower electrode. If the conductivity changes without satisfying an associated predetermined criterion ("remains below threshold value", "less than 100% increase", etc.), then the control unit 9, 9' selects another electrode pair with a highest electrode which is lower, until the conductivity does satisfy the associated predetermined criterion. In that case, the milk height has decreased. By contrast, if the new measured value of the conductivity at the previous electrode pair no longer satisfies the predetermined criterion, then the control unit 9, 9' selects another, higher electrode pair, until the measured value does satisfy the predetermined criterion again. In that case, the milk height has increased. The milking system can thus follow changes in the milk height in a highly dynamic and accurate manner.

In addition to, or instead of, the conductivity of the milk 20, it is also possible to measure another variable between the electrodes 27, 28, such as the impedance, in principle the complex impedance Z, or an associated variable, admittance Y (Y=1/Z). As the admittance can so simply be converted to impedance, only impedance will be discussed below. Roughly speaking, the real part thereof corresponds to the resistance (=1/conductivity). The imaginary part, the reactance, roughly indicates how large the contributions of capacitance and/or self-inductance are. These values depend, inter alia, on the composition of the milk, and on the frequency of the applied voltage. On the basis of the measured values as a function of the frequency, also referred to as dielectric or impedance spectroscopy, it is possible to determine, for example, fat, carbohydrate, cell and/or protein contents. For details regarding this technique, reference is made to the prior art, such as NL9400997 and WO2011/064770.

A major advantage of the present invention is that such spectroscopy can be carried out locally. To this end, the control unit is in particular configured to arbitrarily and/or repeatedly select two electrodes, and to perform the spectroscopic measurements between these two selected electrodes. Using the thus obtained values (the spectrum), the control unit 9, 9' can subsequently determine a local fat content, protein content, carbohydrate content and/or cell count etc. Using the thus obtained local values, the control unit 9, 9' can subsequently determine the overall value of the milk property for the milk in the measuring chamber. It will be clear that this is able to produce more reliable and more precise values, for example owing to redundancy, so that deviations at individual electrodes may be corrected. In addition, corresponding values of the milk property (or milk properties) may also be determined for a part of the milk, such as a top layer (foam layer) or the like.

For the above-mentioned purpose, the milking system optionally comprises a frequency generator, which is only illustrated highly diagrammatically as part 31. The frequency generator 31 may be operatively connected to the electrodes 27, 28 by the control unit 9, 9' and is configured to apply an AC voltage between the selected electrodes. The resulting impedance between the selected electrodes is subsequently measured by the control unit 9, 9' or a dedicated device (not shown here) which is operatively connected to the control unit. In this case, the electrodes 27, 28 are arranged on the printed circuit board 29 with tracks of a suitable, in particular the same, length. Effects of tracks of different lengths may thus be prevented as far as possible.

It should also be noted here that reference numeral 9' either denotes an alternative location for the control unit 9 from FIG. 1, or a part of a distributed control unit 9. In this latter alternative, the electrodes are actuated locally, i.e. near the measuring chamber, by the control unit or a part thereof, and the measured values are processed locally. It is also possible to perform the actuation and/or processing of the measured values externally, such as for example at the location of the control unit 9 in FIG. 1. It is then possible for the measuring chamber 6, and optionally the milking cup 5, to remain lighter and more compact, and the control unit is less susceptible to disruption. In that case, means need to be provided in order to transmit instructions and/or measured values between the measuring chamber 6 and the control unit 9. However, such communication per se is part of the prior art, and is not dealt with in any further detail here.

The control unit 9, 9' is optionally also connected to the controllable valve 8. The size of the passage opening of the valve 8 is determined by the control unit on the basis of the measured milk level. If the milk level in the measuring chamber 6 rises, at least to above a desired value, then the milk flow has evidently increased. In order to compensate for this by means of a milk outflow of an (approximately) equal size through the second milk outflow opening 25, the control unit will open the valve 8 further. By contrast, if the milk level falls, the control unit will close the valve further. This achieves a milk level in the measuring chamber 6 which is substantially as constant as possible.

An advantage of this, for example, is that the measurement constriction 23 connected to the measuring chamber 6 and the second milk outflow opening 25 can always be kept entirely submerged in milk but also continuously flowed through by fresh milk. A very reliable measurement of milk properties can thus be ensured. To this end, for example, an additional sensor is provided on the measurement constriction 23. This additional sensor comprises, for example, an optical sensor in the form of an RGB chip 24, with an LED light source 26 on one side of the measurement constriction and the RGB chip 24 or the like on the opposite side of the measurement constriction. The additional sensor then measures, for example, the transmittance for, or absorption of, one or more colours, on the basis of which it is possible to reach a conclusion about the composition of the milk, such as fat content or, for example, milk containing blood. For details relating to the technique per se, reference is made, for example, to EP1000535A1. The sensor may be connected to the control unit 9, 9', so that the control unit can adjust one or more settings of the milking system 1 on the basis of the measured value from the additional sensor, such as a destination of the milk to a milk tank or sewer or the like, depending on a fat content or classification as milk containing blood/consumption milk of the measured milk. Electrical measurements of the milk may also be used here. For example, a high specific conductivity of the milk will indicate mastitis, which likewise results in unsuitability as consumption milk.

The measurement constriction 23 is, for example, a narrowed part of the measuring chamber 6, with two (approximately) parallel walls which may be permeable to light or other radiation or electromagnetic fields. The internal thickness of the narrowed part is, for example, between 0.1 and 0.5× the internal cross section or thickness of the measuring chamber. It is thus possible, for example, for transmission/absorption measurements of the milk to be more accurate than if measurements were taken over the full cross section or thickness of the measuring chamber. However, the possibility of replacing or omitting the measurement constriction 23, and alternatively taking measurements through the whole measuring chamber 6, is not excluded.

The milking device may sometimes measure an incorrect height of the milk 20 in the measuring chamber 6, for example if the printed circuit board 29 with the electrodes 27, 28 is located along a wall of the measuring chamber 6 and said wall is at an angle to the vertical, such as when attaching the milking cup 5 to a slanted teat. In order to correct for this, it is possible to use an inclination sensor, such as a camera (not shown). This can ascertain whether the milking cup with the housing 17 of the measuring chamber 6 is at an angle from the vertical and, if so, can ascertain this angle using image-processing software suitable for this purpose. The angle thus obtained can be transmitted to the control unit 9 which can use this to determine the correct height of the milk in the measuring chamber 6 according to simple geometric formulas.

An important variable during milking is the milk flow. The milk flow can be determined in a very simple way on the basis of the height of the milk 20 in the measuring chamber 6 and the size of the passage opening of the valve 8. Said passage opening follows, for example, from a reference lookup table and the position of the valve 8. Where the conditions remain otherwise unchanged, in particular the pressure difference between the vacuum in the top part of the measuring chamber 6, in other words in the vacuum line 22, and the vacuum which prevails in order to discharge the milk through the milk hose 7, the milk flow can be simply calculated using hydrostatic equations. Thus, the control unit 9 from FIG. 1, together with the level sensor in the form of the electrodes 27, 28 and the valve 8, could serve as a milk flow meter. In this case, it is assumed that the liquid in the measuring chamber is not a milk/air mixture but substantially pure milk, which is a possible advantage achieved according to the invention. Nevertheless, it is also possible, in addition to the alternative of calibration measurements, to make this calculation of the milk flow more reliable. To this end, for example, the vacuum sensor 29 may be provided, shown here in the vacuum line 22, but it may also be provided in, for example, the top part of the measuring chamber 6. The (milk) vacuum prevailing there, and also the prevailing milk transport vacuum, which is determined by the milking system and can likewise be measured further along the milk hose, determine, together with the height of the milk column, the pressure difference over the passage opening of the valve 8, and thus the volume of the milk flow.

Another variable which can influence the calculation of the milk flow is the height of the milk column above the valve 8. In the diagrammatic representation of FIG. 2, this will be approximately constant, independently of the height at which the milking cup 5 is attached to a teat. However, as the valve 8 may also be located much further along the milk hose 7, for example a meter or more, it may be the case that the height of the milk column above the valve can vary greatly depending on the height of the teats of the dairy animal. In order to be able to take into account this height, it may be advantageous to use, for example, the above-mentioned camera (not shown) to determine the height level of the milking cup and/or of the valve 8. From the height difference, it is in particular possible to determine a difference in height of the milk column, which after all fills the measuring chamber up to and including the part of the milk hose 7 up to the valve 8. It should be noted here that the teat height is a property of the animal, which may also be stored and searched for in the control unit 9 of the milking system. In this case, it is assumed that the resulting position and shape of the milk hose, and thus the height difference between the measuring chamber 6 and the valve 8, is substantially constant during each milking operation of said dairy animal. In this case, other measurement methods and sensors for determining and taking into account this height difference are not ruled out.

It is also possible to provide an additional milk flow meter, in particular in the milk hose 7. For example, this is located downstream of the valve 8, but could also be between the measuring chamber 6 and the valve 8. As the milk flow is a single-phase system at the location of such a milk flow meter, a great variety of different meters may be used, in particular including very simple and reliable meters. An example of this is a milk flow meter on the basis of the magnetohydrodynamic principle, which has the advantage that it can measure the milk flow in an entirely contactless manner.

The embodiments shown only serve to illustrate the invention, without limiting it. The scope of protection is defined by means of the attached claims.

The invention claimed is:

1. A milking system for milking a dairy animal, comprising:
   a milking cup for obtaining milk from the dairy animal,
   a measuring chamber which is in flow communication with the milking cup for at least temporarily containing the obtained milk, and having a sensor device arranged therein for measuring at least one property of the milk, wherein the sensor device comprises,
   a plurality of at least three mutually separate electrodes for measuring values of a first milk property using an electrical and/or electromagnetic variable, and
   a sensor control unit for actuating the sensor device and for processing the measured values,
   wherein the sensor control unit is configured to repeatedly select a pair of the electrodes, the pair comprising an arbitrary first electrode and an arbitrary second electrode which differs from the first electrode, and wherein each electrode is selectable as the first electrode, and each electrode is selectable as the second electrode,
   wherein the sensor device is configured to measure a value of a variable between the electrodes of said selected pair, and to determine a value of the at least one milk property on a basis of the value or values of the variable measured using one or more selected electrode pairs, and
   wherein the measuring chamber is rigidly connected to the milking cup in a unitary manner.

2. The milking system as claimed in claim 1, wherein the variable comprises a conductance, conductivity or impedance, or amplitude or phase angle thereof.

3. The milking system as claimed in claim 1, wherein the first milk property comprises a height of milk in the measuring chamber,
   wherein the sensor device is configured to measure a variable between a first electrode of the plurality of electrodes, and a second electrode, which is situated higher up during milking, of the plurality of electrodes, and to determine the height depending on a height of the selected pair of electrodes in the measuring chamber and on a comparison of a measured value with a corresponding value as measured by a pair of other electrodes.

4. The milking system as claimed in claim 3, wherein the comparison shows that the measured value changes in a predetermined manner with respect to said corresponding value, and
   wherein the predetermined manner comprises that the conductance, conductivity or impedance falls by at least a predetermined percentage.

5. The milking system as claimed in claim 4, wherein the predetermined percentage is 25%.

6. The milking system as claimed in claim 4, wherein the predetermined percentage is 50%.

7. The milking system as claimed in claim 3, wherein the measuring chamber further comprises a milk discharge opening and a valve device having a controllable passage opening and a valve control unit for controlling the valve device, and
   wherein the valve control unit is operatively connected to the sensor control unit and is configured to control the passage opening on the basis of a measured value of the height.

8. The milking system as claimed in claim 7, wherein the valve control unit is operatively connected to the sensor control unit and is configured to control the passage opening on the basis of a measured value of the height in such a way that the height of the milk in the measuring chamber is kept constant as much as possible.

9. The milking system as claimed in claim 1, wherein the sensor device is also configured to measure a second milk property of the milk in the measuring chamber, not being a milk level, from the measured values.

10. The milking system as claimed in claim 9, wherein an electrode of the plurality of electrodes which is at a bottom during milking comprises or is a temperature sensor.

11. The milking system as claimed in claim 10, wherein the electrode of the plurality of electrodes which is at the bottom during milking comprises or is a temperature-dependent resistor.

12. The milking system as claimed in claim 1, wherein the sensor device comprises a temperature sensor.

13. The milking system as claimed in claim 1, wherein the sensor control unit comprises a frequency generator and is configured to measure a value of the variable at least one frequency and
   wherein the sensor control unit is configured to determine at least one content of a component of the milk on the basis of the measured values.

14. The milking system as claimed in claim 13, wherein the at least one frequency is between 10 kHz and 10 GHz.

15. The milking system as claimed in claim 13, wherein the sensor control unit comprises a frequency generator and is configured to measure a value of the variable at a series of a plurality of frequencies.

16. The milking system as claimed in claim 1, wherein the plurality of electrodes is arranged on a printed circuit board.

17. The milking system as claimed in claim 1, further comprising an optical sensor sub-device, having at least one optical sensor, and which is configured to measure at least one optical property of the milk or milking operation.

18. The milking system as claimed in claim 17, wherein the optical sensor sub-device comprises at least one LED, which is configured to emit light detectable by the optical sensor.

19. The milking system as claimed in claim 17, wherein the optical sensor sub-device comprises an RGB chip.

20. The milking system as claimed in claim 1, wherein the electrodes are in a row.

* * * * *